(12) United States Patent
Zhou et al.

(10) Patent No.: US 11,692,917 B2
(45) Date of Patent: Jul. 4, 2023

(54) TENSILE TESTING DEVICE INCLUDING A TENSILE TESTING FIXTURE FOR IMPROVED SPECIMEN TENSILE STRESS ACCURACY

(71) Applicant: TRIPLE WIN TECHNOLOGY (SHENZHEN) CO. LTD., Shenzhen (CN)

(72) Inventors: Wei Zhou, Shenzhen (CN); Hai-Ping Wang, Shenzhen (CN); Yu-Mei Deng, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 161 days.

(21) Appl. No.: 17/354,447

(22) Filed: Jun. 22, 2021

(65) Prior Publication Data
US 2021/0404924 A1    Dec. 30, 2021

(30) Foreign Application Priority Data

Jun. 30, 2020    (CN) .......................... 202010622377.6

(51) Int. Cl.
*G01N 3/08* (2006.01)
*G01N 3/04* (2006.01)

(52) U.S. Cl.
CPC .................. *G01N 3/08* (2013.01); *G01N 3/04* (2013.01)

(58) Field of Classification Search
None
See application file for complete search history.

(56) References Cited

U.S. PATENT DOCUMENTS

| | | | | |
|---|---|---|---|---|
| 3,057,032 A | * | 10/1962 | Harding | G01N 3/04 29/34 R |
| 4,753,115 A | * | 6/1988 | Moody | G01L 5/0033 73/862.01 |
| 6,314,814 B1 | * | 11/2001 | Brannon | G11B 5/58 73/705 |
| 2016/0231216 A1 | * | 8/2016 | Liu | G01N 3/04 |

FOREIGN PATENT DOCUMENTS

CN    110646281 A    1/2020

* cited by examiner

*Primary Examiner* — Lisa M Caputo
*Assistant Examiner* — Nigel H Plumb
(74) *Attorney, Agent, or Firm* — ScienBiziP, P.C.

(57) ABSTRACT

A tensile testing fixture and a tensile testing device with improved specimen tensile stress accuracy are provided. The fixture includes a base, an adjusting mechanism disposed on the base, a floating mechanism disposed on and connected to the adjusting mechanism, a lower head disposed on and connected to the floating mechanism, and an upper head disposed above the lower head. The floating mechanism is configured to transmit a pulling force of the lower head to the adjusting mechanism. The adjusting mechanism is configured to adjust a position of the floating mechanism in a horizontal direction under the pulling force. The floating mechanism is further configured to adjust a position of the lower head in the horizontal direction, causing the lower head and the upper head to be coaxial in a vertical direction.

20 Claims, 5 Drawing Sheets

TENSILE TESTING DEVICE INCLUDING A TENSILE TESTING FIXTURE FOR IMPROVED SPECIMEN TENSILE STRESS ACCURACY

FIELD

The subject matter herein generally relates to tensile testing, and more particularly, to a tensile testing fixture and a tensile testing device.

BACKGROUND

Tensile stress of a to-be-tested product can be tested by a tensile testing fixture. The testing fixture includes an upper head and a lower head. In use, one end of the product is fixed on the upper head, and other end is fixed on the lower head. The upper head and the lower head are manually aligned to be vertically coaxial. Then, the tensile stress can be tested by driving the upper head to move away from the lower head.

However, manually aligning the upper head and the lower head may have a poor accuracy. Furthermore, the upper head may deviate from the vertical axis of the lower head during moving, which makes the testing result to be inaccurate.

BRIEF DESCRIPTION OF THE DRAWINGS

Implementations of the present technology will now be described, by way of embodiment, with reference to the attached figures.

DETAILED DESCRIPTION

Figure 1:
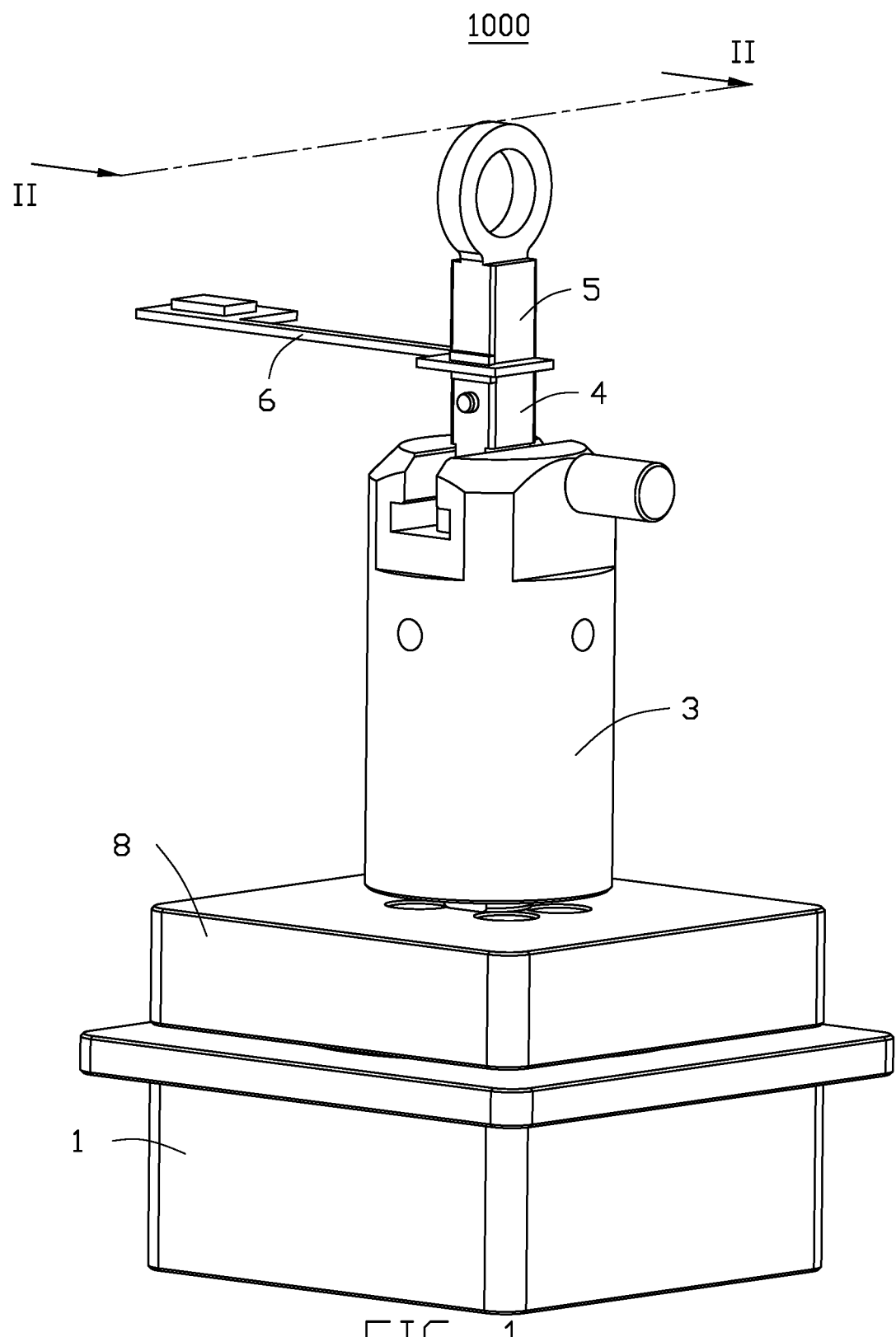
FIG. 1 is a diagrammatic view of a tensile testing fixture according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
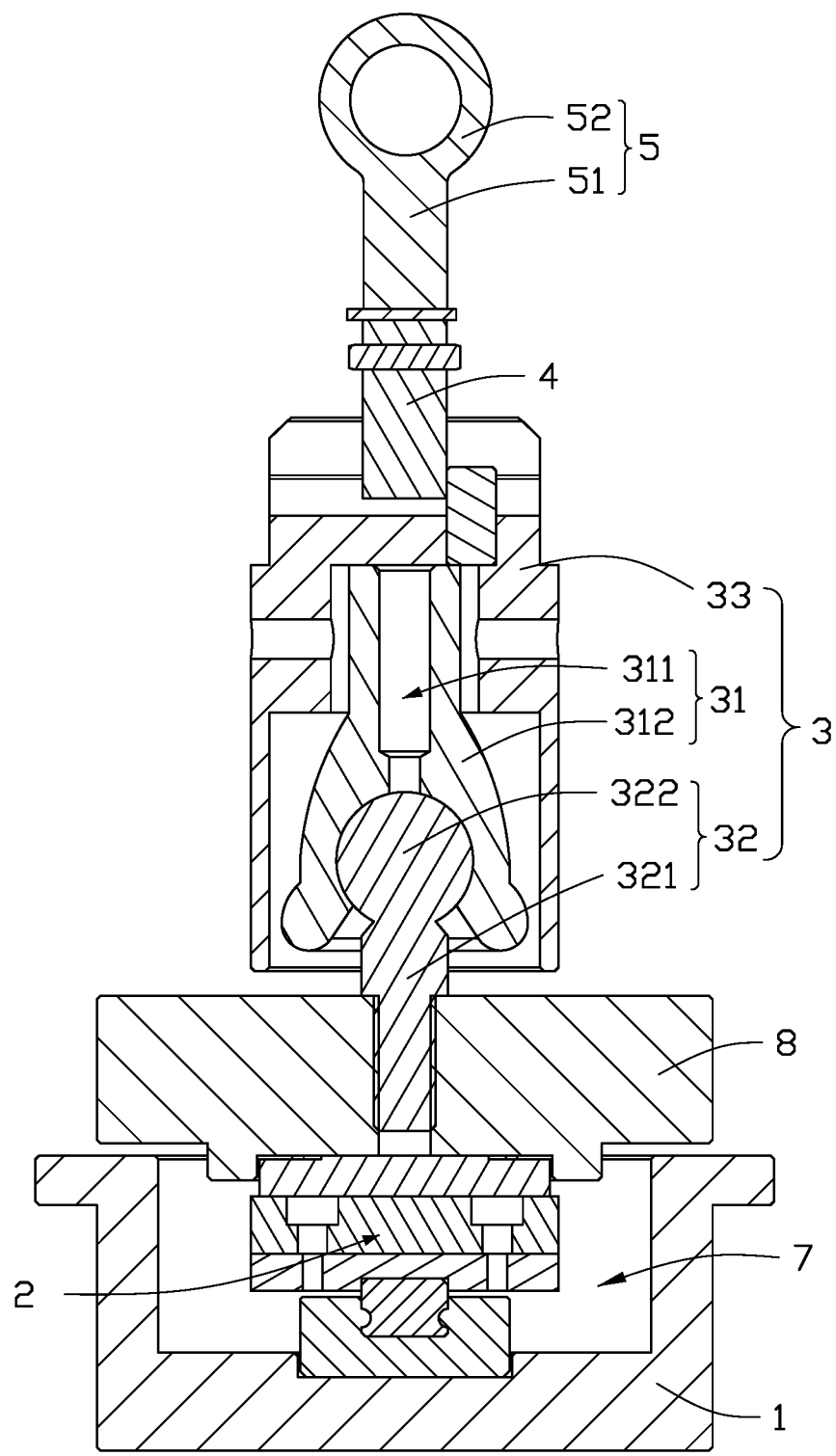
FIG. 2 is a cross-sectional view of the tensile testing fixture of FIG. 1.

FIGS. 1 and 2 illustrate an embodiment of a tensile testing fixture 1000. The tensile testing fixture 1000 includes a base 1, an adjusting mechanism 2 disposed on the base 1, a floating mechanism 3 disposed on and connected to the adjusting mechanism 2, a lower head 4 disposed on and connected to the floating mechanism 3, and an upper head 5 disposed above the lower head 4. A to-be-tested product 6 can be placed between the upper head 5 and the lower head 4.

In use, the base 1 is mounted on a testing platform of a tensile testing device. Thus, the tensile testing fixture 1000 is assembled to the tensile testing device. The upper head 5 is fixed on a lifting rod of the tensile testing device. One surface of the product 6 is fixed to the lower head 4, and another opposite end of the product 6 is fixed to the upper head 5. Then, the upper head 5 move upwards when driven by the lifting rod, thereby testing the tensile stress of the product 6.

The adjusting mechanism 2 can coarsely adjust a position of the floating mechanism 3 in a horizontal direction before testing, thereby adjusting a position of the lower head 4 in a horizontal direction. As such, the upper head 5 and the lower head 4 tend to be coaxial in the vertical direction. However, in actual use, the upper head 5 may still deviate from the axis of the lower head 4 in the vertical direction after the coarse adjustment of the adjusting mechanism 2.

In the present disclosure, the floating mechanism 3 and the adjusting mechanism 2 cooperate to eliminate the axial deviation between the lower head 4 and the upper head 5 (fine adjustment). When the upper head 5 move upwards, the upper head 5 applies a pulling force on the lower head 4. The lower head 4 in turn transmits the pulling force to the floating mechanism 3 connected thereto. If the lower head 4 and the upper head 5 are not coaxial in the vertical direction, the pulling force applied to the lower head 4 is not in the vertical direction. Then, the pulling force will be decomposed into two forces in different directions, one is a pulling force in the vertical direction (but not coaxial with the pulling force of the upper head 5), and the other is a pushing force in the horizontal direction. The pushing force in the horizontal direction is transmitted to the adjusting mechanism 2 through the floating mechanism 3, which can adjust the position of the adjusting mechanism 2 in the horizontal direction, thereby adjusting the position of the floating mechanism 3 in the horizontal direction. The floating mechanism 3 in turn adjust the position of the lower head 4 in the horizontal direction, so the lower head 4 and the upper head 5 can be coaxial in the vertical direction.

The working principle of the floating mechanism 3 and the adjusting mechanism 2 will be described as follows.

Referring to FIG. 2, the base 1 defines a groove 7 for receiving the adjusting mechanism 2. The adjusting mechanism 2 can adjust the position of the floating mechanism 3 in the horizontal direction, and more specifically, in a first horizontal direction and a second horizontal direction perpendicular to the first horizontal direction. The adjusting mechanism 2 includes a first adjusting unit 21, a supporting plate 22 disposed on the first adjusting unit 21, and a second adjusting unit 23 disposed on the supporting plate 22. The floating mechanism 3 is disposed on the second adjusting unit 23. The first adjusting unit 21 can drive the supporting plate 22 to move in the first horizontal direction, thereby driving the second adjusting unit 23 to move in the first horizontal direction. Thus, the floating mechanism 3 and the lower head 4 can move along the first horizontal direction. The second adjusting unit 23 can drive the floating mechanism 3 to move in the second horizontal direction, thereby driving the floating mechanism 3 and the lower head 4 to move in the second horizontal direction.

In at least one embodiment, the first adjusting unit 21 includes a first seat 211 disposed on the base 1, a first sliding groove 212 defined in the first seat 211, and a first sliding rail 213 slidably engaged with the first sliding groove 212. The first sliding rail 213 extends in the first horizontal direction. When an external force in the first horizontal direction is applied to the first adjusting unit 21, the first seat 211 can move along the first sliding rail 213 and drive the second adjusting unit 23 to move in the first horizontal direction, thereby driving the floating mechanism 3 and the lower head 4 to move in the first horizontal direction.

The second adjusting unit 23 includes a second seat 233 disposed on the supporting plate 22, a second sliding groove 232 defined in the second seat 233, and a second sliding rail 231 slidably engaged with the second sliding groove 232. The floating mechanism 3 is disposed on the second seat 233. The second sliding rail 231 extends in the second horizontal direction. When an external force in the second horizontal direction is applied to the second adjusting unit 23, the second seat 233 can move along the second sliding rail 231, thereby driving the floating mechanism 3 and the lower head 4 to move in the second horizontal direction.

As such, the adjusting mechanism 2 adjusts the position of the lower head 4 in the first and the second horizontal directions. Then, the upper head 5 and the lower head 4 can be coaxial in the vertical direction.

Figure 3:
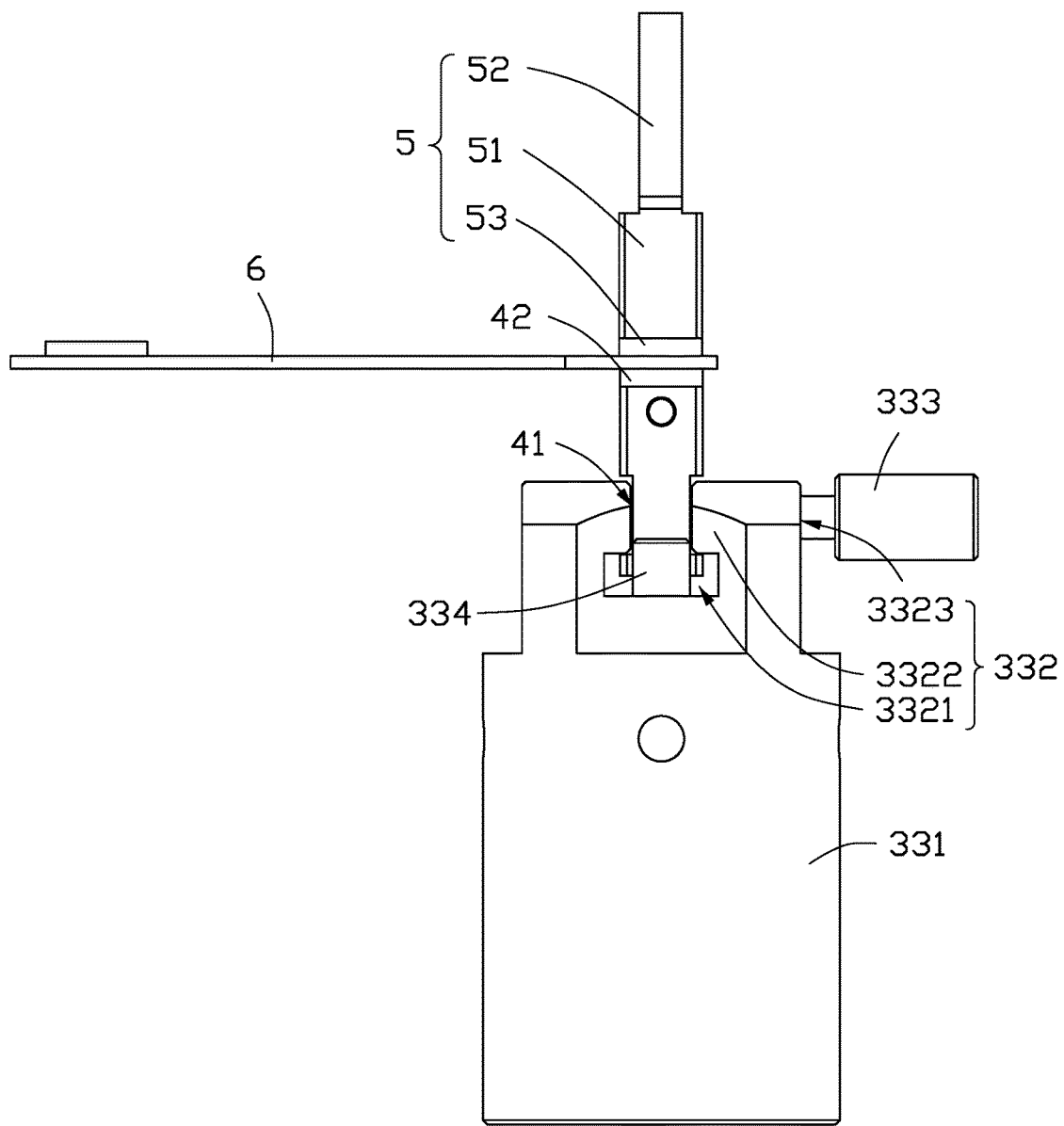
FIG. 3 is a diagrammatic view wherein a sleeve, a lower head, and an upper head of the tensile testing fixture of FIG. 1 are connected to each other.
Figure 4:
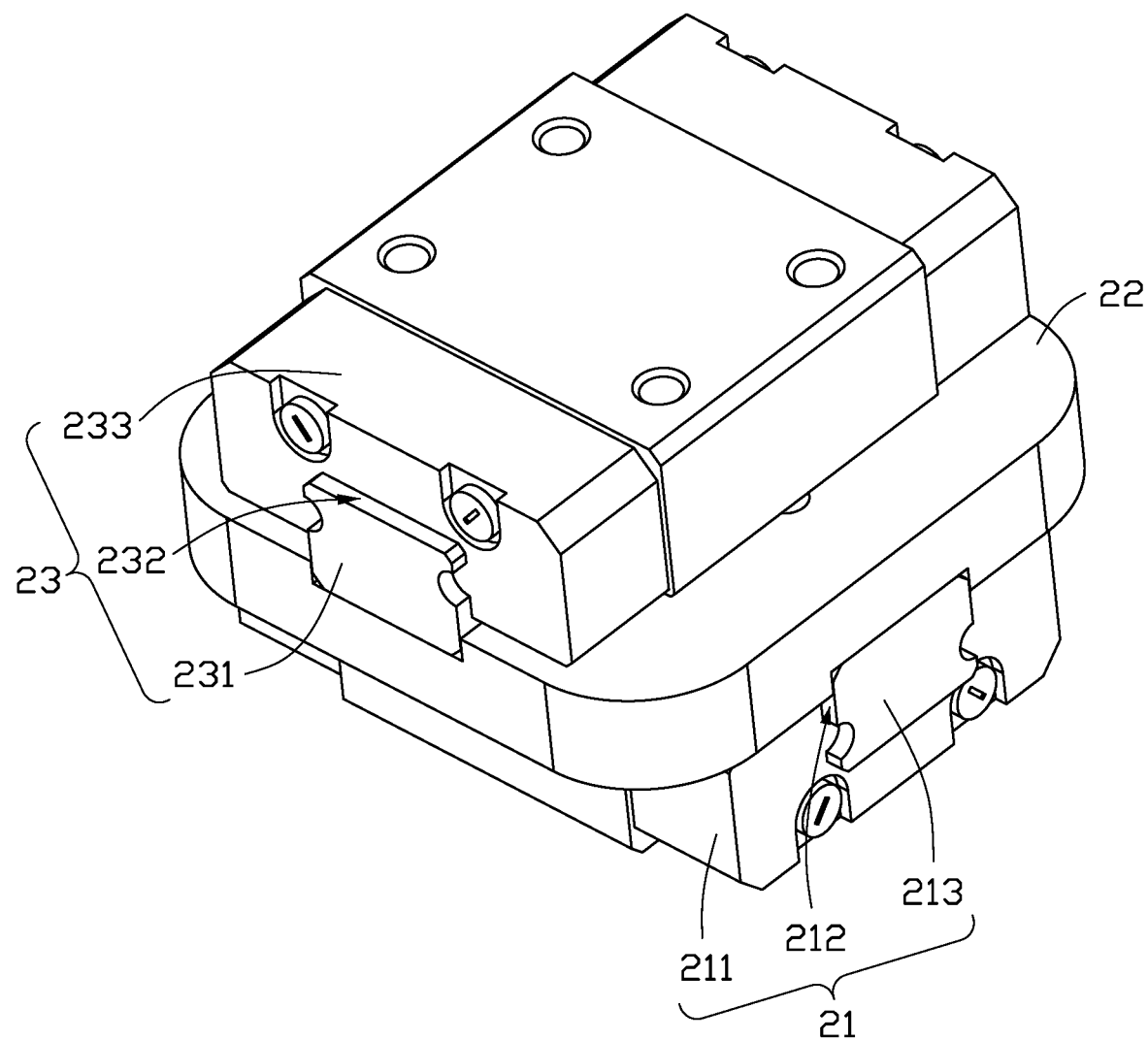
FIG. 4 is a diagrammatic view of an adjusting mechanism of the tensile testing fixture of FIG. 1.

Referring to FIGS. 2 and 3, in at least one embodiment, the floating mechanism 3 includes a first floating joint 31 and a second floating joint 32 movably connected to the first floating joint 31. The first floating joint 31 is connected to the lower head 4, and is coaxial with the lower head 4 in the vertical direction. The second floating joint 32 is connected between the first floating joint 31 and the adjusting mechanism 2. As described above, if the lower head 4 and the upper head 5 are not coaxial in the vertical direction, the pulling force applied to the lower head 4 will be decomposed into a pulling force in the vertical direction and a pushing force in the horizontal direction. The pushing force in the horizontal direction is first transmitted to the floating mechanism 3. Since the first floating joint 31 is connected to the lower head 4, the first floating joint 31 can remain coaxial with the lower head 4 under the pushing force. However, since the second floating joint 32 is movably connected to the first floating joint 31, the second floating joint 32 will deviate from the first floating joint 31. At this time, the first floating joint 31 can apply another pushing force in the horizontal direction to the second floating joint 32, and the second floating joint 32 can transmit the pushing force to the adjusting mechanism 2. As such, the adjusting mechanism 2 can adjust the position in the horizontal direction under the pushing force. The second floating joint 32 and the first floating joint 31 can then be coaxial in the vertical direction, so that the lower head 4 and the upper head 5 can be coaxial in the vertical direction.

In at least one embodiment, the floating mechanism 3 further includes a sleeve 33 surrounding the first floating joint 31 and the second floating joint 32. The lower head 4 is fixed on the top portion of the sleeve 33. One end of the first floating joint 31 away from the second floating joint 32 is received in the sleeve 33 and fixed to the top end of the sleeve 33. One end of the second floating joint 32 away from the first floating joint 31 is fixed on the second adjusting unit 23.

In at least one embodiment, the first floating joint 31 includes a first connecting rod 311 and a sheath 312 surrounding the first connecting rod 311. The second floating joint 32 includes a second connecting rod 321 and a connecting head 322 connected to one end of the second connecting rod 321 close to the first floating joint 31. The other end of the second connecting rod 321 is fixed at the second seat 233 of the adjusting mechanism 2. The connecting head 322 is spherical and rotatably received in the sheath 312. The connecting head 322 further abuts against an end of the first connecting rod 311 away from the lower head 4, causing the connecting head 322 and the first connecting rod 311 to movably connected to each other. The sheath 312 ensures that the connecting head 322 and the first connecting rod 311 may not be separated from each other.

In at least one embodiment, a fixing ring 8 is disposed on the groove 7. The fixing ring 8 is detachably fixed on the adjusting mechanism 2. The second connecting rod 321 passes through the fixing ring 8 and connects to the adjusting mechanism 2. The fixing ring 8 can stabilize the second floating joint 32 to prevent the second floating joint 32 from shaking.

Referring to FIG. 3, in at least one embodiment, the sleeve 33 includes a sleeve body 331, a fixing portion 332 in the sleeve body 331, a fastening portion 333 engaged with the fixing portion 332, and a limiting portion 334. The lower head 4 can be fixed in the fixing portion 332.

In at least one embodiment, the fixing portion 332 includes an opening 3321 and two protrusions 3322 disposed on two opposite inner sidewalls of the opening 3321. The lower head 4 defines two slots 41 corresponding to the protrusions 3322. The lower head 4 can be fixed in the opening 3321 through an engagement between the protrusions 3322 and the slots 41. The limiting portion 334 is fixed in the opening 3321 and disposed below the lower head 4. The limiting portion 334 can be a rectangular block that can block one end of the opening 3321, thereby further preventing the lower head 4 to insert into one end of the opening 3321 and then exit out of the other end. The outer sidewall of the opening 3321 also defines a through hole 3323. The fastening portion 333 is inserted into the through hole 3323 for further fixing the lower head 4 in the opening 3321. In at least one embodiment, the fastening portion 333 and the through hole 3323 are connected by screws.

Referring to FIG. 3, the upper head 5 includes a head body 51, a pulling ring 52 connected to an end of the head body 51 away from the lower head 4, and a first fixing portion 53 connected to another end of the head body 51 facing the lower head 4. The pulling ring 52 can be hung on a hook of the tensile testing device. The lower head 4 includes a second fixing portion 42 at an end facing the upper head 5. During the test of the tensile stress, the first fixing device 53 and the second fixing device 42 can fix two surfaces of the product 6. In at least one embodiment, each of the first fixing device 53 and the second fixing device 42 may be an adhesive layer.

Figure 5:
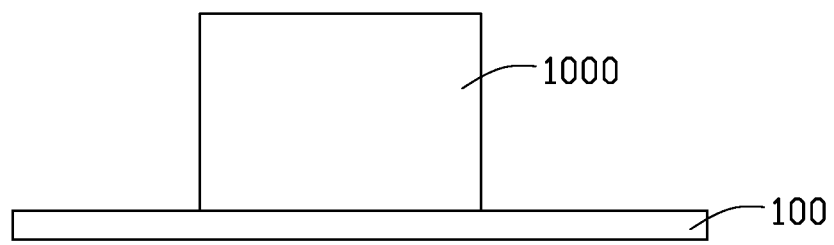
FIG. 5 is a diagrammatic view of an embodiment of a tensile testing device according to the present disclosure.

FIG. 5 illustrates an embodiment of a tensile testing device 2000, including a testing platform 100, a tensile testing fixture 1000 disposed on the testing platform 100, a lifting rod 200 disposed above the testing platform 100, and a hook 300 connected to the lifting rod 200.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A tensile testing fixture, comprising:
a base;
an adjusting mechanism disposed on the base;
a floating mechanism disposed on and connected to the adjusting mechanism;
a lower head disposed on and connected to the floating mechanism; and
an upper head disposed above the lower head;
wherein the floating mechanism is configured to transmit a pulling force of the lower head to the adjusting mechanism, the adjusting mechanism is configured to adjust a position of the floating mechanism in a horizontal direction under the pulling force, the floating mechanism is further configured to adjust a position of the lower head in the horizontal direction, causing the lower head and the upper head to be coaxial in a vertical direction.

2. The tensile testing fixture of claim 1, wherein the adjusting mechanism comprises a first adjusting unit, a supporting plate disposed on the first adjusting unit, and a second adjusting unit disposed on the supporting plate, the floating mechanism is disposed on the second adjusting unit;
wherein the horizontal direction comprises a first horizontal direction and a second horizontal direction perpendicular to the first horizontal direction, the first adjusting unit is configured to drive the supporting plate to move in the first horizontal direction, thereby driving the floating mechanism and the lower head to move in the first horizontal direction;
wherein the second adjusting unit is configured to drive the floating mechanism to move in the second horizontal direction, thereby driving the floating mechanism and the lower head to move in the second horizontal direction.

3. The tensile testing fixture of claim 2, wherein the first adjusting unit comprises a first seat disposed on the base, and a first sliding groove defined in the first seat, and a first sliding rail slidably engaged with the first sliding groove, the first sliding rail extends in the first horizontal direction, the first seat is configured to move along the first sliding rail and drive the second adjusting unit to move in the first horizontal direction, thereby driving the lower head to move in the first horizontal direction.

4. The tensile testing fixture of claim 2, wherein the second adjusting unit comprises a second seat disposed on the supporting plate, a second sliding groove defined in the second seat, and a second sliding rail slidably engaged with the second sliding groove, the floating mechanism is disposed on the second seat, the second sliding rail extends in the second horizontal direction, the second seat is configured to move along the second sliding rail, thereby driving the lower head to move in the second horizontal direction.

5. The tensile testing fixture of claim 4, wherein the floating mechanism comprises a first floating joint and a second floating joint movably connected to the first floating joint, the first floating joint is connected to the lower head, and is coaxial with the lower head in the vertical direction, and the second floating joint is connected between the first floating joint and the adjusting mechanism.

6. The tensile testing fixture of claim 5, wherein the floating mechanism further comprises a sleeve surrounding the first floating joint and the second floating joint, the lower head is fixed on a top portion of the sleeve, one end of the first floating joint away from the second floating joint is received in the sleeve and fixed to the top end of the sleeve, and one end of the second floating joint away from the first floating joint is fixed on the second adjusting unit.

7. The tensile testing fixture according to claim 6, wherein the sleeve comprises a sleeve body and a fixing portion in the sleeve body, the fixing portion comprises an opening and a protrusion disposed on an inner sidewall of the opening, the lower head defines a slot, the slot and the protrusion are engaged with each other, causing the lower head to be fixed in the opening.

8. The tensile testing fixture of claim 7, wherein the sleeve further comprises a fastening portion, an outer sidewall of the opening defines a through hole, and the fastening portion is inserted into the through hole to fix the lower head in the opening.

9. The tensile testing fixture of claim 7, wherein the sleeve further comprises a limiting portion, the limiting portion is fixed in the opening and disposed below the lower head.

10. The tensile testing fixture of claim 5, wherein the first floating joint comprises a first connecting rod and a sheath surrounding the first connecting rod, the second floating joint comprises a second connecting rod and a connecting head connected to one end of the second connecting rod close to the first floating joint, another end of the second connecting rod is fixed at the second seat, the connecting head is spherical and rotatably received in the sheath, the connecting head further abuts against an end of the first connecting rod away from the lower head, causing the connecting head and the first connecting rod to movably connected to each other.

11. A tensile testing device, comprising:
a testing platform;
a tensile testing fixture disposed on the testing platform, the tensile testing fixture comprising:
a base;
an adjusting mechanism disposed on the base;
a floating mechanism disposed on and connected to the adjusting mechanism;
a lower head disposed on and connected to the floating mechanism; and
an upper head disposed above the lower head, wherein the floating mechanism is configured to transmit a pulling force of the lower head to the adjusting mechanism, the adjusting mechanism is configured to adjust a position of the floating mechanism in a horizontal direction under the pulling force, the floating mechanism is further configured to adjust a position of the lower head in the horizontal direction, causing the lower head and the upper head to be coaxial in a vertical direction; and
a lifting rod configured to drive the upper head to move away from the lower head in the vertical direction.

12. The tensile testing device of claim 11, wherein the adjusting mechanism comprises a first adjusting unit, a supporting plate disposed on the first adjusting unit, and a second adjusting unit disposed on the supporting plate, the floating mechanism is disposed on the second adjusting unit;
wherein the horizontal direction comprises a first horizontal direction and a second horizontal direction perpendicular to the first horizontal direction, the first adjusting unit is configured to drive the supporting plate to move in the first horizontal direction, thereby driving the floating mechanism and the lower head to move in the first horizontal direction;
wherein the second adjusting unit is configured to drive the floating mechanism to move in the second horizontal direction, thereby driving the floating mechanism and the lower head to move in the second horizontal direction.

13. The tensile testing device of claim 12, wherein the first adjusting unit comprises a first seat disposed on the base, and a first sliding groove defined in the first seat, and a first sliding rail slidably engaged with the first sliding groove, the first sliding rail extends in the first horizontal direction, the first seat is configured to move along the first sliding rail and drive the second adjusting unit to move in the first horizontal direction, thereby driving the lower head to move in the first horizontal direction.

14. The tensile testing device of claim 12, wherein the second adjusting unit comprises a second seat disposed on the supporting plate, a second sliding groove defined in the second seat, and a second sliding rail slidably engaged with the second sliding groove, the floating mechanism is disposed on the second seat, the second sliding rail extends in the second horizontal direction, the second seat is configured to move along the second sliding rail, thereby driving the lower head to move in the second horizontal direction.

15. The tensile testing device of claim 14, wherein the floating mechanism comprises a first floating joint and a second floating joint movably connected to the first floating joint, the first floating joint is connected to the lower head, and is coaxial with the lower head in the vertical direction, and the second floating joint is connected between the first floating joint and the adjusting mechanism.

16. The tensile testing device of claim 15, wherein the floating mechanism further comprises a sleeve surrounding the first floating joint and the second floating joint, the lower head is fixed on a top portion of the sleeve, one end of the first floating joint away from the second floating joint is received in the sleeve and fixed to the top end of the sleeve, and one end of the second floating joint away from the first floating joint is fixed on the second adjusting unit.

17. The tensile testing device of claim 16, wherein the sleeve comprises a sleeve body and a fixing portion in the sleeve body, the fixing portion comprises an opening and a protrusion disposed on an inner sidewall of the opening, the lower head defines a slot, the slot and the protrusion are engaged with each other, causing the lower head to be fixed in the opening.

18. The tensile testing device of claim 17, wherein the sleeve further comprises a fastening portion, an outer sidewall of the opening defines a through hole, and the fastening portion is inserted into the through hole to fix the lower head in the opening.

19. The tensile testing device of claim 17, wherein the sleeve further comprises a limiting portion, the limiting portion is fixed in the opening and disposed below the lower head.

20. The tensile testing device of claim 15, wherein the first floating joint comprises a first connecting rod and a sheath surrounding the first connecting rod, the second floating joint comprises a second connecting rod and a connecting head connected to one end of the second connecting rod close to the first floating joint, another end of the second connecting rod is fixed at the second seat, the connecting head is spherical and rotatably received in the sheath, the connecting head further abuts against an end of the first connecting rod away from the lower head, causing the connecting head and the first connecting rod to movably connected to each other.

* * * * *